July 10, 1934.                    W. J. McLACHLAN                    1,966,208
                                  CONTROL SYSTEM
                                Filed Oct. 21, 1933
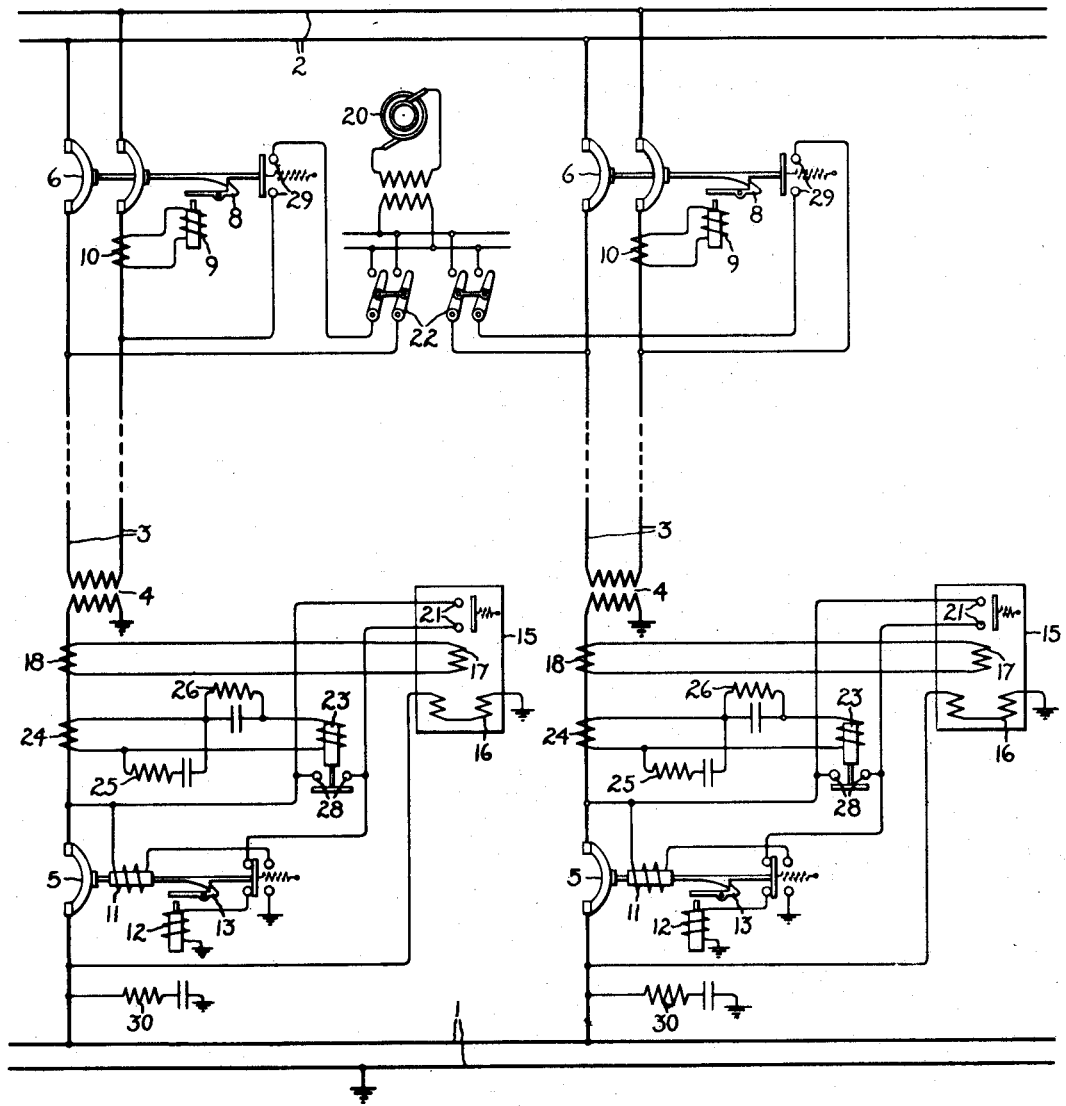
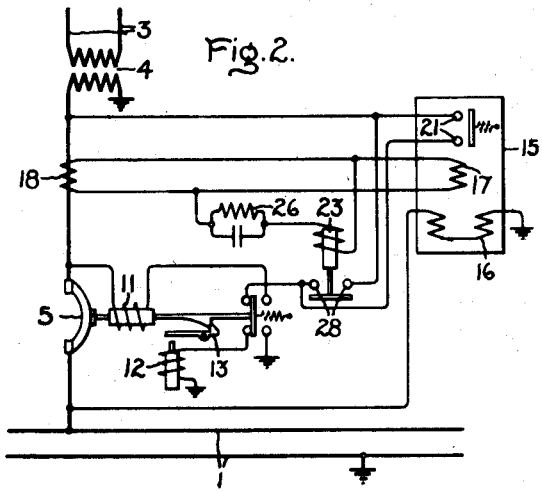
Inventor.
Willard J. McLachlan,
by Harry E. Dunham
His Attorney.

Patented July 10, 1934

1,966,208

UNITED STATES PATENT OFFICE 1,966,208

CONTROL SYSTEM

Willard J. McLachlan, Scotia, N. Y., assignor to General Electric Company, a corporation of New York Application October 21, 1933, Serial No. 694,589

11 Claims. (Cl. 171—97)

My invention relates to control systems for circuit breakers and particularly to a control system for controlling the operation of a network circuit breaker in a feeder supplying current to a network, and one object of my invention is to provide an improved arrangement for effecting the opening of such a network circuit breaker by supplying carrier current to the feeder. My invention is especially adapted for use in network circuit breaker control system in alternating-current network systems.

It has been previously proposed to effect the opening of an alternating-current network circuit breaker by supplying carrier current to the feeder at the source end thereof and using a carrier receiving equipment connected in shunt with the feeder at the network end so that the receiver operated in response to the carrier voltage existing at the point to which it was connected. Such an arrangement has the disadvantage that if a low frequency carrier voltage is used so that the carrier current can be transmitted through a step-down power transformer connected in the feeder, the impedance of the network load on a large network system acts as a short circuit for the carrier voltage induced in the transformer secondary winding thus preventing the voltage on the network side of the transformer from building up to a sufficient value to operate the receiver unless a very large capacity source of carrier current is used. Furthermore, if a source of sufficient size is used to obtain such a voltage, this voltage will appear over the network and will effect the operation of the carrier receivers associated with other feeders connected to the network and therefore will not give the desired selective operation.

If a high frequency carrier voltage is used, the carrier current cannot be transmitted through the power transformer connected in the feeder and therefore it is necessary to connect the carrier receiver to the high voltage side of the transformer. One disadvantage of such an arrangement is that the cost of the high voltage coupling equipment is relatively expensive and not as reliable as desirable.

In accordance with my invention, I overcome the difficulties encountered in such arrangements by coupling the carrier receivers in series relation with the low voltage windings of the respective feeder transformers. Therefore when the carrier current source is connected to a feeder, the distribution of the carrier current between the feeders is such that only in the feeder to which the carrier current source is connected does sufficient carrier current flow to effect the operation of the associated carrier receiver.

My invention will be better understood from the following description, when taken in connection with the accompanying drawing, and its scope will be pointed out in the appended claims.

In the accompanying drawing, Fig. 1 is a diagram of a control system for a network circuit breaker embodying my invention and Fig. 2 is a diagram showing a modification of the control arrangement shown in Fig. 1.

Referring to Fig. 1, 1 is an alternating-current network which is arranged to be supplied with electric energy from a suitable alternating-current supply circuit 2 by means of a plurality of feeders 3, two of which are shown in the drawing. In order to simplify the disclosure, single-phase circuits are shown, but it is obvious that my invention is equally applicable to polyphase circuits.

Each feeder 3 includes a step-down power transformer 4, the low voltage secondary winding of which is arranged to be connected to the network 1 by means of suitable switching means 5 and the high voltage primary winding of which is arranged to be connected to the supply circuit 2 by suitable switching means 6. The transformers 4 and the secondary switching means 5 are usually located near the network 1, whereas the primary switching means 6 are usually in the main station or substation containing the supply circuit 2.

The switching means 6, which may be of any suitable type, examples of which are well known in the art, are usually arranged in any suitable manner so that they may be opened and closed by an operator and are also preferably arranged so that they are automatically opened in response to overload conditions on the respective feeders. As shown, each switching means 6 is an overload circuit breaker of the well-known latched-in type which is adapted to be closed manually and which is adapted to be opened by releasing a latch 8 either manually or automatically by means of an overload coil 9 connected in series relation with the respective feeder 3 by means of a current transformer 10.

The switching means 5 may be of any suitable type, examples of which are well known in the art. As shown in the drawing, each switching means 5 is a latched-in circuit breaker and includes a closing coil 11 which, when energized, closes the circuit breaker and a trip coil 12 which, when energized, releases a latch 13 which holds the circuit breaker in its closed position.

In order to effect the immediate opening of a circuit breaker 5 when a fault occurs on its associated feeder 3 of transformer 4 and causes a large reversal of energy to flow through the circuit breaker 5, each feeder is provided with a suitable reverse power relay 15. As shown, each relay 15 has a potential coil 16 which is permanently connected across the network 1 and a current coil 17 which is connected in series relation with the secondary winding of the associated transformer 4 by means of a current transformer 18. Each reverse power relay 15 is arranged to close its normally open contacts 21 when the reverse power exceeds a predetermined amount. The closing of the contacts 21 is arranged to complete an energizing circuit for the trip coil 12 of the associated circuit breaker 5 so as to effect the opening thereof.

Preferably, the reverse power relays 15 are set so that they close their respective contacts 21 in response to relatively large reversals of energy in their respective feeders only. Also the reverse power relays are preferably designed in any suitable manner, examples of which are well known in the art, so that the amount of reverse power required to cause a relay to close its contacts 21 varies directly with the network voltage.

In order that an operator at the main station may effect the opening of any of the network circuit breakers 5 so as to disconnect the associated feeder 3 from the network 1, I provide at the main station a suitable relatively low voltage source of carrier current 20 and suitable means, such as switches 22, for individually connecting this source 20 to each feeder 3. The frequency of this carrier current source 20 is preferably higher than the normal frequency of the supply circuit 2 and of such a value that it can be readily transmitted through the power transformer 4. I find that frequency of about 720 cycles gives very satisfactory results for this purpose, but it is to be understood that my invention is not limited to a carrier current of any particular frequency.

For receiving this carrier current, each power transformer secondary winding has connected in series relation therewith suitable current-responsive means, such as a relay 23, which is connected in any suitable manner, examples of which are well known in the art, whereby currents of the carrier current frequency flowing through the associated transformer secondary can effect the operation of the relay, but currents of normal frequency cannot effect the operation of the relay. In the particular arrangement shown in Fig. 1 this result is accomplished by connecting each relay 23 to the secondary winding of the current transformer 24, the primary winding of which is connected in series with the associated power transformer secondary winding and the network and providing around the winding of each relay 23 a by-pass circuit 25 tuned to the frequency of the supply circuit 2. Also, if desired, a blocking circuit 26 tuned to the frequency of the supply circuit 2 may be connected in series with the winding of each relay 23 in addition to or in place of the by-pass circuit 25. Therefore when either the by-pass circuit 25 or blocking circuit 26, or both of them, are used, the relays 23 do not respond to current of the normal frequency flowing in the associated feeders. These relays however do operate in response to a predetermined amount of carrier current in their respective feeders. Each relay 23, when it operates, closes its contacts 28 to complete an energizing circuit for the trip coil 12 of the associated circuit breaker 5.

The operation of the arrangement shown in Fig. 1 is as follows: When the operator desires to take any particular feeder 3 out of service, he first opens the associated circuit breaker 6 so as to disconnect the feeder from the supply circuit 2. The feeder 3 is still energized from the network 1, however, because the associated circuit breaker 5 is still closed. The operator then closes the switch 22 associated with the feeder to be taken out of service so as to connect the carrier current source 20 thereto. In order to insure that the associated circuit breaker 6 is open before the source 20 is connected to the feeder, it may be desirable in some cases to connect the auxiliary contacts 29 of the associated circuit breaker 6 in series with the contacts of the switch 22.

The connection of the carrier current source 20 to the feeder 3 causes current of the same frequency to be supplied by the associated transformer 4 to the network. This carrier current will divide between the network load and the secondary circuits of the other power transformer 4 connected to the network 1 in accordance with their respective impedances. It will be observed that all of the carrier current supplied by the source 20 flows through the secondary winding of the power transformer 4 in the feeder 3 to be disconnected, whereas only a small portion of this total carrier current flows through any of the other transformer secondary windings which may be connected to the network. Therefore by properly setting the relays 23, only the relay 23 associated with the feeder through which the carrier current is supplied to the network receives sufficient current to effect the operation thereof. The operated relay 23, by closing its contacts 28, completes an energizing circuit for the trip coil 12 of the associated circuit breaker 5 so as to effect the opening thereof. Therefore it will be seen that I have provided an arrangement whereby the selective operation of any circuit breaker 5 depends upon the relative current distribution between the feeders of the carrier current supplied by the carrier current source when it is connected to any of the feeders.

In order to insure that there will be a sufficiently low impedance load connected to the network 1 to prevent any other feeder receiving enough carrier current to effect the operation of its associated relay 23 when the source 20 is connected to some other feeder, it may be desirable in some cases, to connect across the network 1, one or more low impedance by-pass circuits 30 tuned to the frequency of the carrier current source.

After a feeder 3 has been taken out of service, it may be put back in by the operator closing the associated switch 6 so as to connect the feeder to the supply circuit 2. As soon as the feeder is energized, the closing coil 11 of the associated circuit breaker 5 is energized to effect the closing thereof to reconnect the feeder to the network 1.

In case of a fault in any feeder 3 or its associated transformer 4, the excessive current in the feeder causes the trip coil 9 connected thereto to be energized sufficiently to effect the opening of the associated circuit breaker 6. Energy also is fed to the fault from the network 1 and this reverse flow of energy causes the associated reverse power relay 15 to close its contacts 21 thereby completing an energizing circuit for the trip coil 12 of the associated circuit breaker 5 to effect the opening thereof.

In the arrangement shown in Fig. 2, I have shown a modification of the arrangement shown in Fig. 1 which eliminates the necessity of having two current transformers 18 and 24. In this modification the relay 23, instead of being connected to a separate transformer 24, is connected in parallel with the current winding 17 of the reverse power relay 15. A suitable blocking circuit tuned to the frequency of the supply circuit 2 is connected in series with the winding of the relay 23.

While I have, in accordance with the patent statutes, shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States is:

1. In combination, a network, a plurality of feeders supplying current to said network, each feeder including switching means connecting it to said network, and means for effecting the selective operation of any one of said switching means to disconnect the associated feeder from said network including a source of alternating current having a predetermined frequency, means for connecting said source to the feeder to be disconnected from said network, and means controlled by the relative current distribution between said feeders of the current supplied by said source when it is connected to any feeder for selectively effecting the operation of the switching means included in the feeder to which said source is connected.

2. In combination, an alternating-current network, a plurality of feeders supplying current of a predetermined frequency to said network, each feeder including a power transformer and associated switching means connecting the secondary winding of the transformer to said network, and means for effecting the selective operation of any one of said switching means to disconnect the associated transformer secondary winding from said network including a source of alternating current having a different predetermined frequency, means for connecting said source to the primary winding of the transformer whose secondary winding is to be disconnected from said network, and means controlled by the relative current distribution between said transformer secondary windings of the current supplied by said source when it is connected to any feeder for selectively effecting the operation of the switching means associated with the feeder to which said source is connected.

3. In combination, an alternating-current network, a plurality of feeders supplying current of a predetermined frequency to said network, each feeder including switching means connecting it to said network, and means for effecting the selective operation of any one of said switching means to disconnect the associated feeder from said network including a source of alternating current having a different predetermined frequency, means for connecting said source to the feeder to be disconnected from said network, individual current controlled means associated with certain of said feeders, means for supplying to each current controlled means a current proportional to the current of said different predetermined frequency flowing in the associated feeder circuit when said source is connected to any of said feeders, and means controlled by each current controlled means for effecting the disconnection of the associated feeder from said network when the current of said different predetermined frequency exceeds a predetermined amount in the associated feeder.

4. In combination, an alternating-current network, a plurality of feeders supplying current of a predetermined frequency to said network, each feeder including switching means connecting it to said network, and means for effecting the selective operation of any one of said switching means to disconnect the associated feeder from said network including a source of alternating current having a different predetermined frequency, means for connecting said source to the feeder to be disconnected from said network, current-responsive means connected in series relation with certain of said feeders for controlling the operation of the associated switching means, and means for rendering each current-responsive means non-responsive to the flow of current of said first-mentioned frequency in the associated feeder.

5. In combination, an alternating-current network, a plurality of feeders supplying current of a predetermined frequency to said network, each feeder including switching means connecting it to said network, and means for effecting the selective operation of any one of said switching means to disconnect the associated feeder from said network including a source of alternating current having a different predetermined frequency, means for connecting said source to the feeder to be disconnected from said network, an individual current transformer for certain of said feeders having its primary winding connected in series relation with the associated feeder, current-responsive means connected in series relation with the secondary winding of each current transformer for controlling the operation of the associated switching means, and a by-pass circuit tuned to said first-mentioned frequency connected in shunt with each current-responsive means.

6. In combination, an alternating-current network, a plurality of feeders supplying current of a predetermined frequency to said network, each feeder including switching means connecting it to said network, and means for effecting the selective operation of any one of said switching means to disconnect the associated feeder from said network including a source of alternating current having a different predetermined frequency, means for connecting said source to the feeder to be disconnected from said network, an individual current transformer for certain of feeders having its primary winding connected in series relation with the associated feeder, current-responsive means connected in series relation with the secondary winding of each current transformer for controlling the operation of the associated switching means and a blocking circuit tuned to said first-mentioned frequency connected in series with each current-responsive means.

7. In combination, an alternating-current network, a plurality of feeders supplying current of a predetermined frequency to said network, each feeder including a power transformer and associated switching means connecting the secondary winding of the transformer to said network, and means for effecting the selective operation of any one of said switching means to disconnect the associated transformer secondary winding from said network including a source of alternating current having a different predetermined frequency, means for connecting said source to the primary winding of the transformer whose secondary winding is to be disconnected from said network, an individual current-responsive means connected in series relation with certain of said transformer secondary windings and the network for effecting the operation of the associated switching means, and means for rendering each current-responsive means non-responsive to the flow of current of said first-mentioned frequency through the secondary winding of the associated transformer.

8. In combination, an alternating-current network, a plurality of feeders supplying current of a predetermined frequency to said network, each feeder including switching means connecting it to said network, and means for effecting the selective operation of any one of said switching means to disconnect the associated feeder from said network including a source of alternating current having a different predetermined frequency, means for connecting said source to the feeder to be disconnected from said network, means controlled by the relative current distribution between said feeders of the current supplied by said source when it is connected to any feeder for selectively effecting the operation of the switching means included in the feeder to which said source is connected, and a by-pass circuit tuned to said different predetermined frequency connected across said network.

9. In combination, an alternating-current network, a plurality of feeders supplying current of a predetermined frequency to said network, each feeder including a power transformer and associated switching means connecting the secondary winding of the transformer to said network, and means for effecting the selective operation of any one of said switching means to disconnect the associated transformer secondary winding from said network including a source of alternating current having a different predetermined frequency, means for connecting said source to the primary winding of the transformer whose secondary winding is to be disconnected from said network, means controlled by the relative current distribution between said transformer secondary windings of the current supplied by said source when it is connected to any feeder for selectively effecting the operation of the switching means associated with the feeder to which said source is connected, and a low impedance by-pass circuit tuned to said different frequency connected across said network.

10. In combination, an alternating-current network, a plurality of feeders supplying current of a predetermined frequency to said network, each feeder including switching means connecting it to said network, means for effecting the selective operation of any one of said switching means to disconnect the associated feeder from said network including a source of alternating current having a different predetermined frequency, means for connecting said source to the feeder to be disconnected from said network, and means controlled by the relative current distribution between said feeders of the current supplied by said source when it is connected to any feeder for selectively effecting the operation of the switching means included in the feeder to which said source is connected, and power directional means associated with each feeder for effecting the operation of the switching means of the associated feeder to disconnect it from said network when a flow of electric energy of substantial magnitude only flows from said network to the associated feeder.

11. In combination, an alternating-current network, a plurality of feeders supplying current of a predetermined frequency to said network, each feeder including a power transformer and associated switching means connecting the secondary winding of the transformer to said network, means for effecting the selective operation of any one of said switching means to disconnect the associated transformer secondary winding from said network including a source of alternating current having a different predetermined frequency, means for connecting said source to the primary winding of the transformer whose secondary winding is to be disconnected from said network, and means controlled by the relative current distribution between said transformer secondary windings of the current supplied by said source when it is connected to any feeder for selectively effecting the operation of the switching means associated with the feeder to which said source is connected, and power directional means associated with each transformer secondary winding for effecting the operation of the associated switching means to disconnect the associated transformer secondary winding from said network when a flow of electric energy of substantial magnitude only flows from said network to the associated transformer secondary winding.

WILLARD J. McLACHLAN.